Dec. 4, 1923.
E. O. BEARDSLEY ET AL
MOLDING MACHINE
Filed Nov. 28, 1921
1,476,134
3 Sheets-Sheet 2
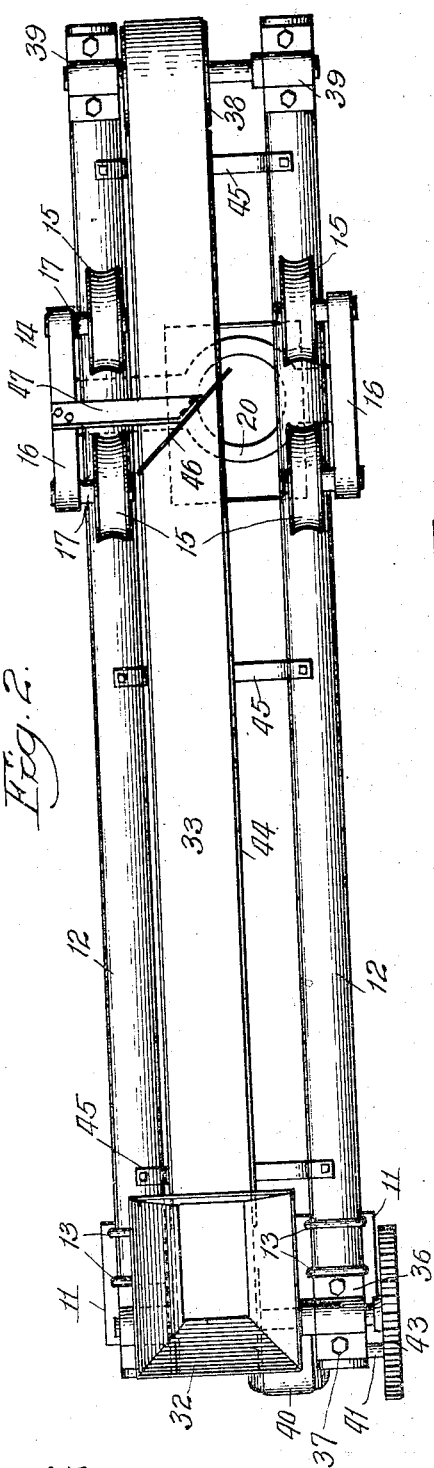
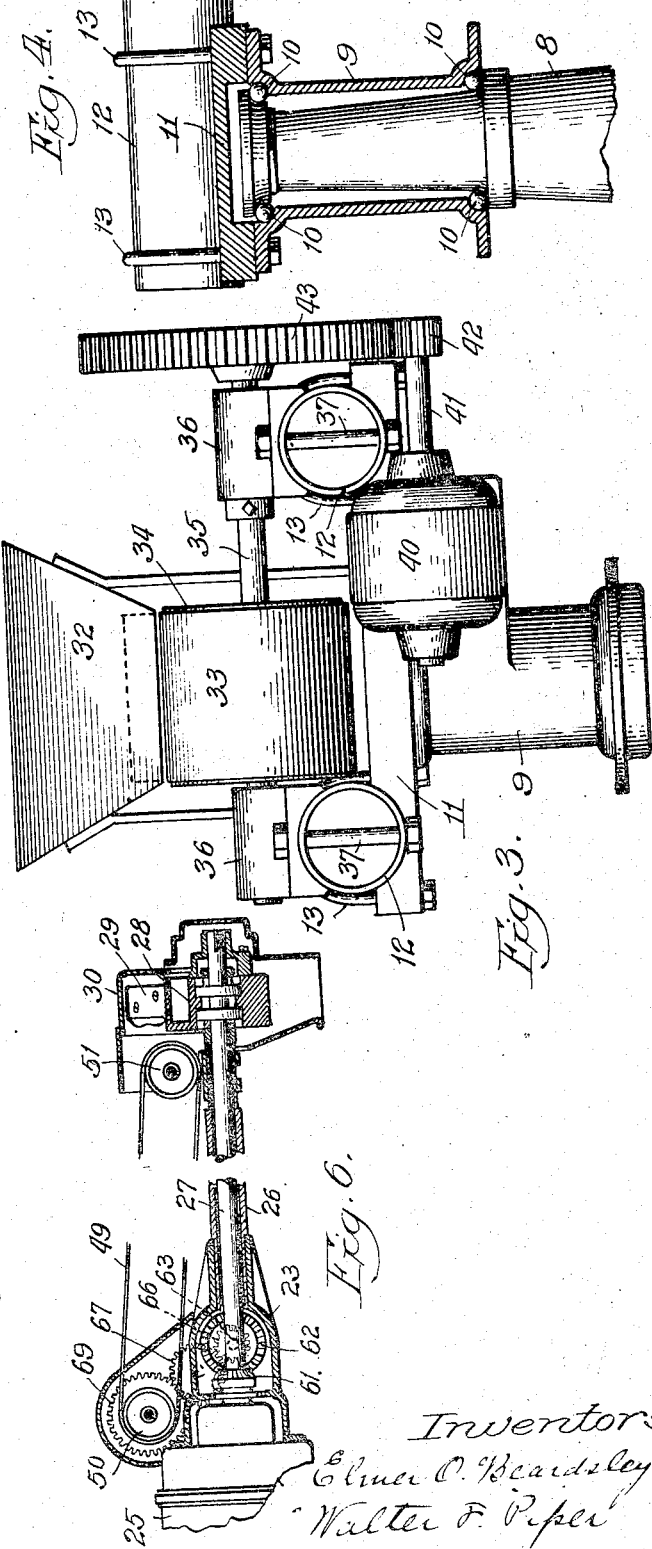
Witness:
John Enders
Inventors:
Elmer O. Beardsley
Walter F. Piper
By Fred Gerlach
their Atty.

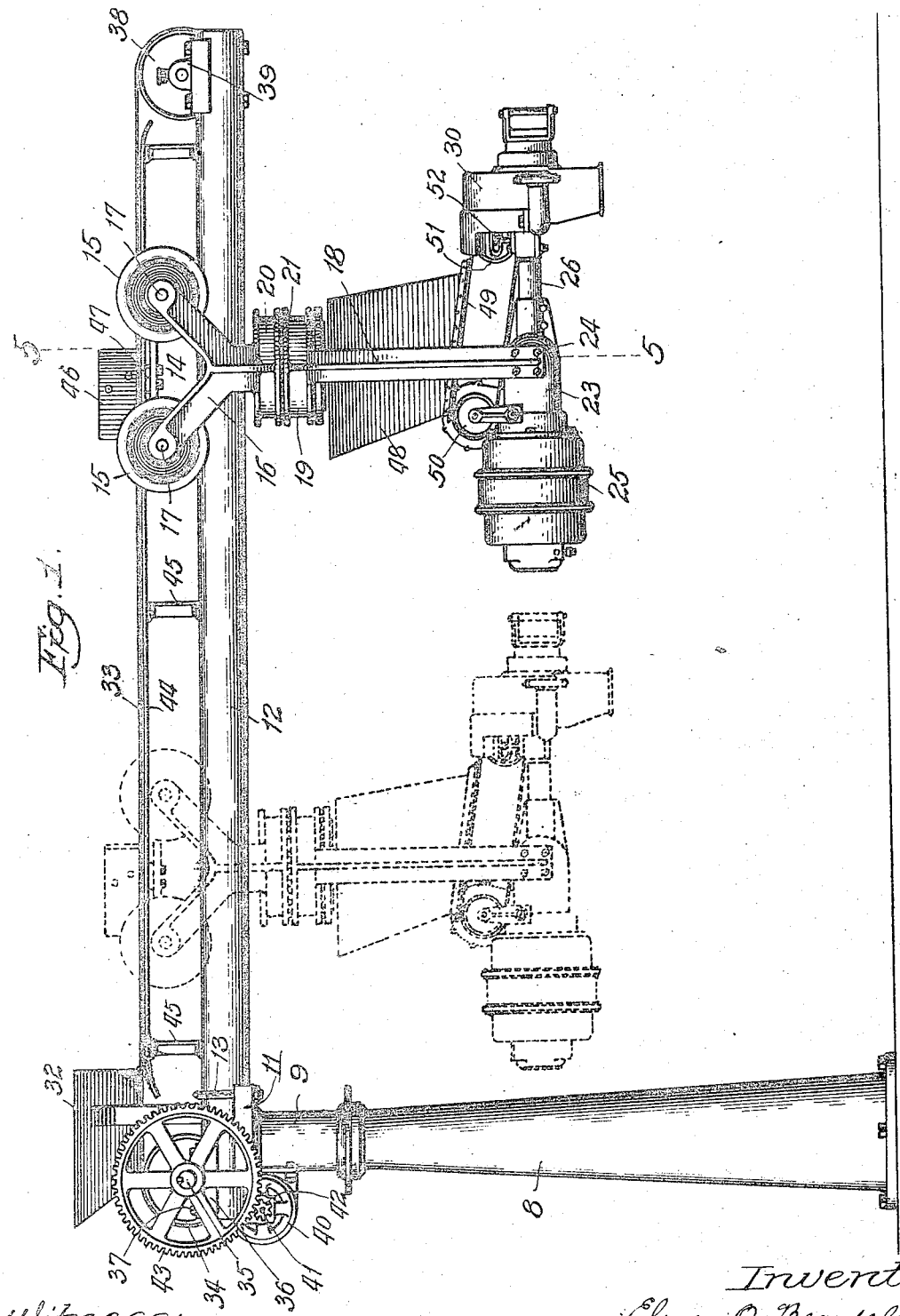

Dec. 4, 1923.
E. O. BEARDSLEY ET AL
1,476,134
MOLDING MACHINE
Filed Nov. 28, 1921
3 Sheets-Sheet 3
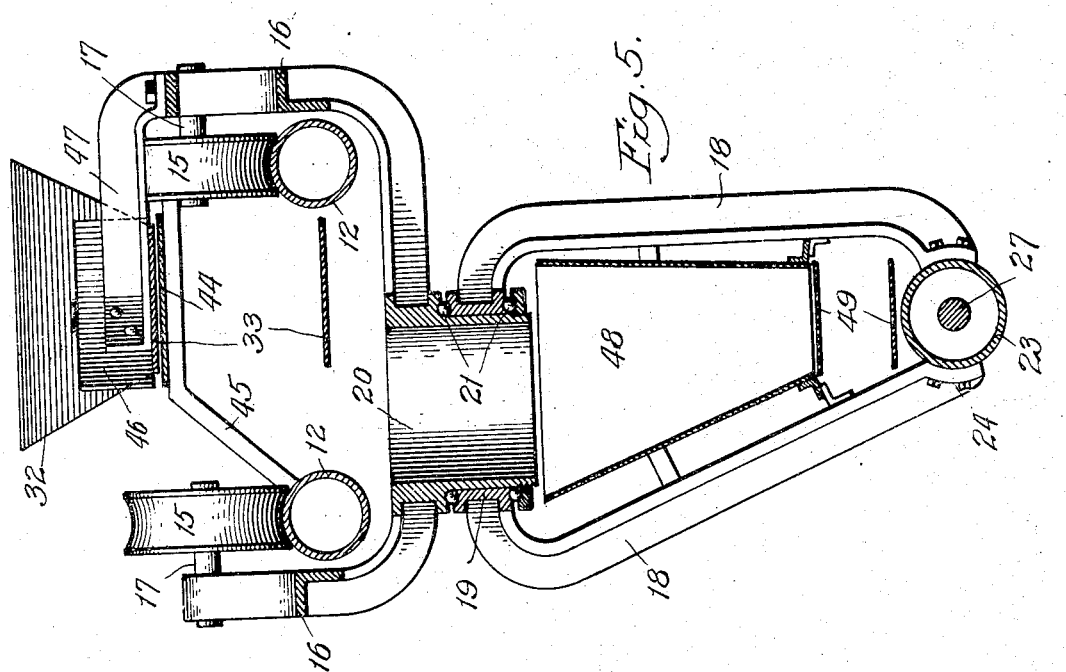
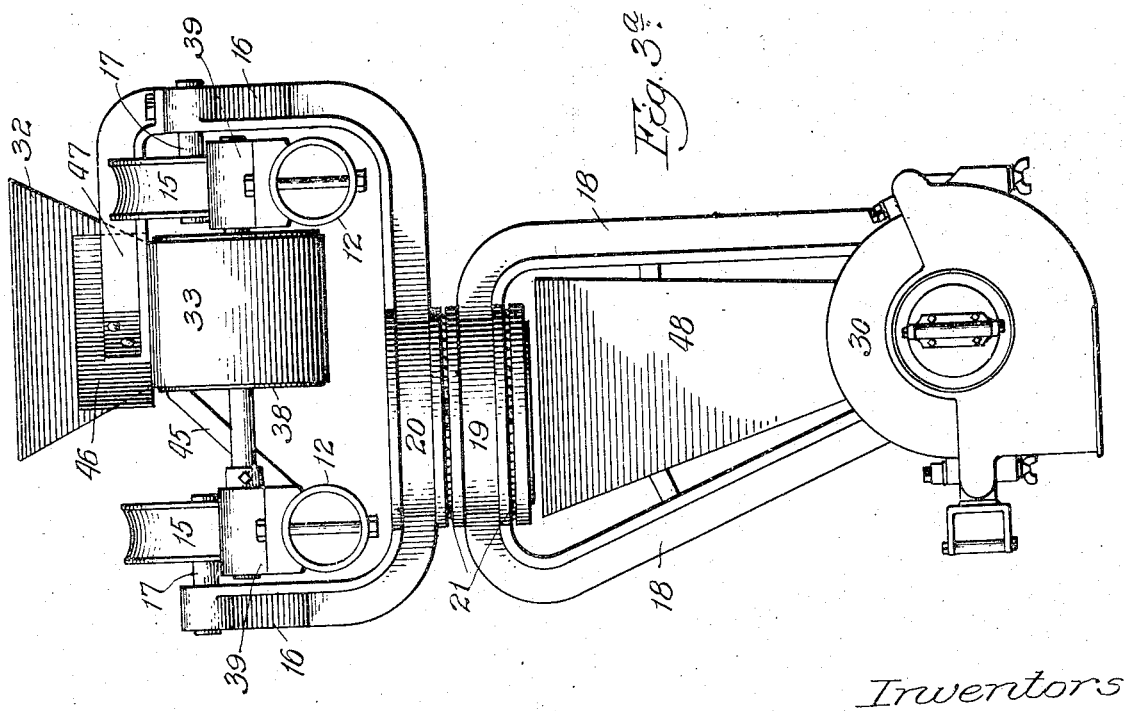

Patented Dec. 4, 1923.

1,476,134

UNITED STATES PATENT OFFICE.

ELMER O. BEARDSLEY AND WALTER F. PIPER, OF CHICAGO, ILLINOIS, ASSIGNORS TO THE BEARDSLEY & PIPER COMPANY, OF CHICAGO, ILLINOIS, A CORPORATION OF ILLINOIS.

MOLDING MACHINE.

Application filed November 28, 1921. Serial No. 518,188.

*To all whom it may concern:*

Be it known that we, ELMER O. BEARDSLEY and WALTER F. PIPER, both citizens of the United States, and residents of Chicago, in the county of Cook and State of Illinois, have invented certain new and useful Improvements in Molding Machines, of which the following is a full, clear, and exact description.

The invention relates to molding machines of the type in which a high speed projector is used to sling wads of sand into flasks to form the moulds. In the practice of the inventions set forth in our Patents Nos. 1,309,833; 1,309,834 and 1,309,835, it has been found possible to expedite the work by moving the projector in a rectilinear path longitudinally of the mould. One object of the invention is to provide an improved molding machine in which provision is made for horizontal rectilinear movement as well as horizontally swinging movement to facilitate the movement of the projector over the flasks. Other objects of the invention will appear from the description.

The invention consists in the several novel features hereinafter set forth and more particularly defined by claims at the conclusion hereof.

In the drawings: Fig. 1 is a side elevation of a machine embodying the invention. Fig. 2 is a plan. Figs. 3 and 3ª are opposite end elevations. Fig. 4 is a detail section of the pivotal connection between the supporting mast and the jib on which the truck for supporting the projector is mounted. Fig. 5 is a section taken on line 5—5 of Fig. 1. Fig. 6 is a longitudinal section through the projector and its operating mechanism.

The invention is exemplified in a structure comprising a stationary column or mast 8 which is rigidly secured to the floor or other support; a socket 9 which is mounted to swing horizontally on the mast, antifriction bearings 10 being provided between said elements; a transversely extending supporting bracket 11 which is integral or rigid with the socket 9; a pair of parallel tubular members 12 which are secured on the supporting bracket 11 and in spaced relation by U-bolts 13 and constitute a horizontally swinging member or jib; a truck 14 provided with rollers 15 adapted to travel on the tubular members 12 of the jib, and comprising a frame 16 suspended from the axles 17 of said rollers; and a bracket 18, the upper end of which is provided with a ring 19 encircling a hollow hub 20 of frame 16 and supported so it can rotate thereon by antifriction bearings 21 and which serves as a support for the sand projector and its driving mechanism. The tubular members forming the jib have, in effect, a track upon which the truck, from which the projector is suspended, may be shifted longitudinally of the jib. A gear casing 23 is secured, at 24, to the lower end of the pending members of the bracket 18. The casing of a motor 25 is secured to one end of the casing. A shaft 27 of said motor extends longitudinally through the case 23 and through a tubular arm or extension member 26 of case 23. A rotor 28 is fixed to the outer end of shaft 27 and carries a shear and projecting blade 29 which is adapted to shear wads of sand from a stream fed to the rotor and to project them into a flask beneath the projector. A casing or stator 30 is suitably supported by the outer end of tubular member 26. The construction of the projector and mechanism for driving it is substantially the same as the corresponding mechanism set forth in an application for Letters Patent filed by us March, 1921, Serial No. 452,068 to which reference may be had for a more detailed description. In lieu of being pivotally connected to the jib, as in said application, the projector and its driving mechanism is secured to a suspension bracket 18 which is supported by the truck 14.

In operation, the projector and its support may be easily shifted longitudinally of the jib to bring it in position to project sand into different portions of a long narrow mould. The pivotal connection between the bracket 18 and the truck 14 permits the projector mechanism to be swung horizontally and transversely of the flask, so that all portions thereof may be properly packed with sand by moving the projector accordingly. An important advantage in the use of a truck for the projecting mechanism is that the jib may be swung horizontally, after the projector has filled a flask, to position the projector over another flask while the previously filled flask is removed and replaced by an empty flask. Another advantage in this construction is that a comparatively short projector shaft may be used and this results in lessening vibration of the parts in which it is mounted.

The mechanism described exemplifies a machine in which the sand projector and its driving mechanism are mounted to move longitudinally on a pivoted support or jib and which is pivotally movable relatively to the jib. It will be understood that the projector is adapted to project sand at high speed in accordance with our aforesaid patents.

The mechanism for feeding sand to the movably suspended projector comprises a hopper 32 which is supported by bracket 11 and over the receiving portion of an endless belt 33, which is disposed above the axis around which the jib swings and is carried by a roller 34 which is fixed to a shaft 35 which is mounted in bearings 36 which are secured by bolts 37 to jib members 12 and a roller 38 adjacent the distal end of the jib and which is mounted in bearings 39 which are secured on top of the outer ends of the jib members 12. Belt 33 is thus mounted to swing laterally with the jib and the parts carried thereby. The case of an electric motor 40 is rigidly secured to the socket 9 and the shaft 41 of said motor is provided with a pinion 42 which meshes with a large gear 43 fixed to one end of the shaft 35. This motor and gearing serves to continuously drive belt 33 to convey sand from the hopper 32 to the outer end of the jib. A table 44 supported by brackets 45 is disposed under the upper reach of the belt 33 to prevent it from sagging. The lower reach of the belt is disposed to run between the tubular members 12 of the jib. The sand on the outwardly moving reach of belt 33 is displaced therefrom by a deflector blade 46 which extends obliquely across the top of the belt. This blade is sustained in operative position over the belt by a bracket 47 which is rigid with the truck 14 so that the deflector will be movable with the truck longitudinally of the jib and the belt 33. This mechanism exemplifies sand feeding mechanism comprising a belt and means for displacing sand from the belt at different points.

The hub 20 of the truck-frame is disposed below and laterally of the feed belt and is hollow, so that the sand displayed from the belt by the deflector 46 will drop through the hub. A hopper 48 is fixedly secured to the arms of the supporting bracket 18 to guide the sand discharged through hub 20 onto a feed belt 49 which is carried by rollers 50 and 51 which are mounted to move with the projector. The gearing for driving roller 50 to operate the feed-belt 49 may be of the construction set forth in our aforesaid application Serial No. 452,068 and consists of a pinion 61 on the shaft 27; a gearing 62 meshing with said pinion; a short shaft 63 rigid with gear 62; a pinion 66 also rigid with said shaft; an idler 67 driven by pinion 66; and a gear 69 fixed to drive the belt 49. Roller 51 is carried by suitable brackets 52 which are secured to the tubular extension 26. The outer portion of said belt is adapted to deliver sand to the projector as set forth in our aforesaid patents and application.

In the present invention, the feed-belt 49 is movable with the projector and a truck, on which the projector is pivotally sustained, and another advantage of the present invention is that a comparatively short feed-belt may be here used.

The operation of the improved machine will be as follows: Sand in regulated volume will be delivered into chute 32 and conveyed outwardly by the belt 33 to the deflector 46 which will displace the sand from the belt so it will drop through the hollow hub 20 and hopper 48 onto the feed belt 49 which will convey it to the projector. In filling a flask beneath the projector, the operator may shift the projector longitudinally of the jib in a rectilinear path, the truck being mounted to move longitudinally of the jib and may also swing the projector and its operating mechanism horizontally relatively to the truck and jib 12, the pivotal connection between bracket 18 and the truck permitting such movement. Whenever the projector is moved longitudinally of the jib, the deflector 46 will move with the truck, so that the point of displacement of the sand from the belt 33 will be changed according to the position of the projector. As a result, the point of displacement will be automatically varied with the shift of the projector. By reason of delivery of the sand to the hollow hub 20 of the truck, there is no operative change in the relative position of the sand feeding mechanism and, as a result, the sand will be continuously and regularly fed to the projector in all of its positions.

The invention is not to be understood as restricted to the details set forth, since these may be modified within the scope of the appended claims, without departing from the spirit and scope of the invention.

Having thus described the invention, what we claim as new and desire to secure by Letters Patent is:

1. In a molding machine, the combination of a substantially horizontal supporting track, a sand projector, means for continuously feeding sand to the projector and a projector support movable longitudinally of said track to bring the projector over different portions of the flask, said projector being retained on said support so it will project sand at a substantially fixed angle of delivery, and a motor for driving the projector.

2. In a molding machine, the combination of a supporting track pivoted to swing horizontally, a sand projector, means for continuously feeding sand to the projector, a projector support movable on the track to bring the projector over different portions of the flask, said projector being retained on said support so it will project sand at a substantially fixed angle of delivery, and a motor for driving the projector.

3. In a molding machine, the combination of a supporting track, a sand projector, a projector support movable on said track to bring the projector over different portions of the flask, a motor for driving said projector, and means for feeding sand to the projector comprising conveying elements on said track and support respectively.

4. In a molding machine, the combination of a substantially horizontal supporting track, a sand projector, means for feeding sand to the projector, a projector support movable on the track to bring the projector over different portions of the flask, said projector being retained on said support so it will project sand at a substantially fixed angle of delivery, and a motor for driving the projector carried by and movable with said support.

5. In a molding machine, the combination of a supporting track pivoted to swing horizontally, a sand-projector, means for feeding sand to the projector, a projector support movable longitudinally of the track to bring it over different portions of the flask, said projector being retained on said support so it will project sand at a substantially fixed angle of delivery, and a motor for driving the projector carried by and movable with said support.

6. In a molding machine, the combination of a supporting track, a sand projector, a projector support movable longitudinally of the track to bring it over different portions of the flask, a motor for driving the projector carried by and movable with said support, and means for feeding sand to the projector comprising conveying elements on the track and the support respectively.

7. In a molding machine, the combination of a substantially horizontal supporting track, a truck mounted on said track and to move longitudinally thereof, a sand-projector mounted on the truck, mechanism for feeding sand longitudinally of the track and to the projector, and a motor for driving the projector, mounted on said truck.

8. In a molding machine, the combination of a pivoted supporting track, a truck mounted on said track and to move longitudinally thereof, a sand projector mounted on the truck so it will be retained to project sand at a substantially fixed angle of delivery, mechanism for feeding sand to the projector, and a motor mounted on said truck for driving the projector.

9. In a molding machine, the combination of a substantially horizontal supporting track, a truck mounted to run on said track and to move longitudinally thereof, a sand projector mounted on the truck so it will be retained to project sand at a substantially fixed angle of delivery, means for feeding sand to the projector comprising a conveying element on the truck, and a motor for driving the projector mounted on said truck.

10. In a molding machine, the combination of a substantially horizontal track, a truck mounted on and to move longitudinally of said track, a sand projector mounted on the truck, means for feeding sand to the projector comprising a belt sustained by the truck, and a motor for driving the belt sustained by said truck.

11. In a molding machine, the combination of a substantially horizontal track, a truck mounted on and to move longitudinally of said track, a sand projector, means for feeding sand to the projector comprising a belt sustained by the truck, and a motor for driving the projector and said belt, mounted on the truck.

12. In a molding machine, the combination of a horizontally swinging track, a truck mounted on and to move longitudinally of said track, a sand projector mounted to swing horizontally and bodily around a substantially vertical axis on the truck, means for feeding sand to the projector, and a motor for driving the projector.

13. In a molding machine, the combination of a support comprising a pair of laterally spaced substantially horizontal supporting track members, a truck provided with means to run on said members of said track, a sand projector mounted on the truck so it will be retained to project sand at a substantially fixed angle of delivery, a motor for driving the projector supported on the truck, and means for feeding sand to the projector.

14. In a molding machine, the combination of a support comprising a pair of laterally spaced substantially horizontal track members, a truck provided with means to run on said members so the truck will move longitudinally of said track, a sand projector supported by and mounted to swing horizontally and bodily around a substantially vertical axis on the truck, a motor for driving the projector mounted to swing therewith, and means for feeding sand to the projector.

15. In a molding machine, the combination of a substantially horizontal track, a truck mounted on and to move longitudinally of said track, a sand projector mounted to swing horizontally and bodily around a substantially vertical axis on the truck, a motor for driving the projector supported by the truck, and means for feeding sand to the projector.

16. In a molding machine, the combination of a substantially horizontally swinging track, a truck mounted on and to move longitudinally of said track, a sand projector mounted to swing horizontally on the truck, a motor for driving the projector supported by the truck, and means for feeding sand to the projector, comprising a driven belt movable with the track and a driven belt movable with the projector.

17. In a molding machine, the combination of a horizontally swinging track, a truck mounted on and to move longitudinally of said track, a sand projector mounted to swing horizontally on the truck, a motor for driving the projector supported by the truck, and means for feeding sand to the projector comprising a belt movable with the track.

18. In a molding machine, the combination of a sand projector, means to movably support the projector, mechanism for feeding sand to the projector comprising a conveyor, and means to displace sand from different portions of the conveyor to deliver sand to the projector in different positions.

19. In a molding machine, the combination of a sand projector, means to movably support the projector, mechanism for feeding sand to the projector comprising a belt, and means to displace sand from different portions of the belt to deliver sand to the projector in different positions.

20. In a molding machine, the combination of a sand projector, means to movably support the projector, mechanism for feeding sand to the projector comprising a horizontally swinging conveyor, and means to displace sand from different portions of the conveyor to deliver sand to the projector in different positions.

21. In a molding machine, the combination of a sand projector, means to movably support the projector mechanism for driving the projector, and mechanism for feeding sand to the projector comprising a conveyor and means to displace sand from different portions of the conveyor movable with the projector so that sand will be delivered thereto in different positions.

22. In a molding machine, the combination of a sand projector, means to movably support the projector, mechanism for driving the projector, and mechanism for feeding sand to the projector comprising a belt and means to displace sand from the belt movable with the projector so that sand will be delivered thereto in different positions.

23. In a molding machine, the combination of a sand projector, a means to movably support the projector comprising a track, mechanism for driving the projector, and mechanism for feeding sand to the projector comprising a conveyor on the track and means to displace sand from different portions of the conveyor movable with the projector so that sand will be delivered thereto in different positions.

24. In a molding machine, the combination of a sand projector, means to movably support the projector, a motor for driving the projector, and mechanism for feeding sand to the projector comprising a conveyor, means to deflect sand from the conveyor to one side thereof, and means for conducting the deflected sand to the projector.

25. In a molding machine, the combination of a sand projector, means to movably support the projector, a motor for driving the projector, and mechanism for feeding sand to the projector comprising a conveyor, means to deflect sand from the conveyor to one side thereof, and means for conducting the deflected sand to and movable with the projector.

26. In a molding machine, the combination of a sand projector, means to movably support the projector, a motor for driving the projector, and mechanism for feeding sand to the projector comprising a belt supported to swing horizontally, means to deflect sand from the belt to one side thereof, and means for conducting the deflected sand to the projector.

27. In a molding machine, the combination of a projector, a hollow pivotal support for the projector, a conveyor to feed sand so it will pass through said support, means to conduct sand from the support to the projector, and a motor for driving the projector.

28. In a molding machine, the combination of a projector, a hollow pivoted support for the projector, means to convey sand so it will pass through said support, and a motor for driving the projector also carried by said support.

29. In a molding machine, the combination of a projector, a hollow pivoted support for the projector connected to the truck, means to feed sand so it will pass through said support, and a motor for driving the projector on said support.

ELMER O. BEARDSLEY.
WALTER F. PIPER.